US011669104B2

(12) United States Patent
Berkemeier et al.

(10) Patent No.: US 11,669,104 B2
(45) Date of Patent: Jun. 6, 2023

(54) USER-ADJUSTABLE TRAJECTORIES FOR AUTOMATED VEHICLE REVERSING

(71) Applicant: Continental Automotive Systems, Inc., Auburn Hills, MI (US)

(72) Inventors: Matthew Donald Berkemeier, Beverly Hills, MI (US); Xin Yu, Troy, MI (US); Dhiren Verma, Farmington Hills, MI (US); Danny Bynum, Auburn Hills, MI (US); Julien Ip, Madison Heights, MI (US); Eduardo Llanos, Auburn Hills, MI (US); Joseph Zagroba, Auburn Hills, MI (US); Kyle Carpenter, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 436 days.

(21) Appl. No.: 16/407,081

(22) Filed: May 8, 2019

(65) Prior Publication Data
US 2019/0346858 A1 Nov. 14, 2019

Related U.S. Application Data

(60) Provisional application No. 62/668,629, filed on May 8, 2018.

(51) Int. Cl.
*G05D 1/02* (2020.01)
*G06T 7/73* (2017.01)
(Continued)

(52) U.S. Cl.
CPC ..... *G05D 1/0253* (2013.01); *B60W 30/18036* (2013.01); *G05D 1/0225* (2013.01);
(Continued)

(58) Field of Classification Search
CPC ...... G05D 1/0253; G05D 1/0225; G06T 7/74; B60W 30/18036; B60W 2050/0005;
(Continued)

(56) References Cited

U.S. PATENT DOCUMENTS 8,560,234 B2 10/2013 Kahn
9,290,202 B2 3/2016 Lavoie
(Continued)

FOREIGN PATENT DOCUMENTS

CN 1577199 A 2/2005
CN 101270983 A 9/2008
(Continued)

OTHER PUBLICATIONS

File history of U.S. Appl. No. 16/575,096, including the final Office Action dated Nov. 5, 2021.
(Continued)

*Primary Examiner* — Ig T An

(57) ABSTRACT

A method for autonomously maneuvering a vehicle in a rearward direction towards a point of interest is provided. The method includes receiving one or more images from a camera positioned on a back portion of the vehicle. The method includes overlaying a path on the one or more images. In addition, the method includes receiving a command by way of a user interface. The command includes instructions to adjust the path. The method includes adjusting the path based on the received command. The method also includes transmitting a drive command to a drive system supported by the vehicle. The drive command causes the vehicle to autonomously maneuver along the adjusted path in a rearward direction.

22 Claims, 8 Drawing Sheets

(51) Int. Cl.
  *B60W 30/18* (2012.01)
  *B60W 50/00* (2006.01)
(52) U.S. Cl.
  CPC .......... *G06T 7/74* (2017.01); *B60R 2300/101* (2013.01); *B60R 2300/302* (2013.01); *B60R 2300/605* (2013.01); *B60R 2300/8026* (2013.01); *B60W 2050/0005* (2013.01)
(58) Field of Classification Search
  CPC ........ B60R 2300/101; B60R 2300/302; B60R 2300/605; B60R 2300/8026
  See application file for complete search history.

(56) References Cited

U.S. PATENT DOCUMENTS

| | | | |
|---|---|---|---|
| 9,500,497 | B2 | 11/2016 | Poulakis |
| 9,533,683 | B2 | 1/2017 | Lavoie |
| 9,969,386 | B1 | 5/2018 | Wang |
| 10,228,700 | B2 * | 3/2019 | Hüger .................. G05D 1/0223 |
| 2004/0254720 | A1 | 12/2004 | Tanaka et al. |
| 2005/0264432 | A1 | 1/2005 | Tanaka et al. |
| 2005/0021203 | A1 | 2/2005 | Iwazaki et al. |
| 2005/0074143 | A1 | 4/2005 | Kawai |
| 2008/0231701 | A1 | 9/2008 | Greenwood et al. |
| 2010/0096203 | A1 * | 4/2010 | Freese V ........... B62D 15/0285 701/37 |
| 2012/0271515 | A1 | 10/2012 | Rhode et al. |
| 2013/0006472 | A1 | 1/2013 | McClain et al. |
| 2014/0052337 | A1 | 2/2014 | Lavoie et al. |
| 2014/0058614 | A1 | 2/2014 | Trombley et al. |
| 2014/0218522 | A1 | 8/2014 | Lavoie et al. |
| 2014/0267688 | A1 | 9/2014 | Aich et al. |
| 2014/0358429 | A1 | 12/2014 | Shutko et al. |
| 2015/0094945 | A1 | 4/2015 | Cheng et al. |
| 2015/0217693 | A1 | 8/2015 | Pliefke et al. |
| 2016/0023601 | A1 * | 1/2016 | Windeler ........... B62D 15/0275 348/118 |
| 2016/0052548 | A1 * | 2/2016 | Singh .................. B62D 15/028 701/41 |
| 2016/0129939 | A1 | 5/2016 | Singh et al. |
| 2016/0146618 | A1 | 5/2016 | Caveney |
| 2016/0304122 | A1 | 10/2016 | Herzog et al. |
| 2016/0378118 | A1 | 12/2016 | Zeng et al. |
| 2017/0050672 | A1 | 2/2017 | Gieseke et al. |
| 2017/0140228 | A1 | 5/2017 | Lang et al. |
| 2017/0151846 | A1 | 6/2017 | Wuergler et al. |
| 2018/0079395 | A1 | 3/2018 | Cekola et al. |
| 2018/0088590 | A1 | 3/2018 | Zhu et al. |
| 2018/0181142 | A1 | 6/2018 | Baran |
| 2018/0188734 | A1 | 7/2018 | Zhu |
| 2018/0194344 | A1 | 7/2018 | Wang et al. |
| 2018/0215382 | A1 * | 8/2018 | Gupta .................... G08G 1/166 |
| 2018/0251153 | A1 | 9/2018 | Li et al. |
| 2018/0312022 | A1 | 11/2018 | Mattern et al. |
| 2018/0350108 | A1 | 12/2018 | Wang |
| 2019/0029109 | A1 | 1/2019 | Uejima |
| 2019/0383945 | A1 | 12/2019 | Wang et al. |
| 2020/0001790 | A1 | 1/2020 | Ling et al. |
| 2020/0019182 | A1 | 1/2020 | Ling et al. |
| 2020/0097021 | A1 | 3/2020 | Carpenter et al. |
| 2021/0163068 | A1 | 6/2021 | Zhu et al. |
| 2021/0197798 | A1 | 7/2021 | Funke et al. |

FOREIGN PATENT DOCUMENTS

| | | | |
|---|---|---|---|
| CN | 102745193 | A | 10/2012 |
| CN | 103998325 | A | 8/2014 |
| CN | 104590116 | A | 5/2015 |
| CN | 106043281 | A | 10/2016 |
| CN | 107567412 | A | 1/2018 |
| CN | 108136867 | A | 6/2018 |
| CN | 108255171 | A | 7/2018 |
| DE | 102012001380 | A1 | 8/2012 |
| DE | 102012005707 | A1 | 10/2012 |
| EP | 2682329 | A1 | 1/2014 |
| EP | 3081405 | A2 | 10/2016 |
| JP | 2004291866 | A | 10/2004 |
| JP | 2005014775 | A | 1/2005 |
| JP | 2005313710 | A | 11/2005 |
| JP | 2016203972 | A | 12/2016 |
| JP | 2017105439 | A | 6/2017 |
| WO | 2016164118 | A2 | 10/2016 |
| WO | 2018160960 | A1 | 9/2018 |

OTHER PUBLICATIONS

File history of U.S. Appl. No. 16/507,749, including the Notice of Allowance dated Jun. 30, 2020.
File history of U.S. Appl. No. 16/530,931, including the final Office Action dated May 4, 2022.
Chinese First Office Action dated Jul. 5, 2022 for the counterpart Chinese Patent Application No. 201980046005.9.

* cited by examiner

Angle Mode

Angle Mode

Distance Mode

Distance Mode

Bi-Arc Mode

Bi-Arc Mode

USER-ADJUSTABLE TRAJECTORIES FOR AUTOMATED VEHICLE REVERSING

CROSS REFERENCE TO RELATED APPLICATIONS

This U.S. patent application claims priority under 35 U.S.C. § 119(e) to U.S. Provisional Application 62/668,629, filed on May 8, 2018, which is hereby incorporated by reference in its entirety.

TECHNICAL FIELD

This disclosure relates to a method and device for user-adjustable trajectories for automated vehicle reversing.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used.

Recent advancements in computing and sensor technology have led to improved vehicle autonomous driving. As such, it is desirable to provide an automated vehicle reverse system that is capable of planning a path from the tow vehicle to the trailer allowing the vehicle to autonomously maneuver towards the trailer.

SUMMARY

One aspect of the disclosure provides a method for autonomously maneuvering a vehicle in a rearward direction towards a point of interest. The method includes receiving, at data processing hardware, one or more images from a camera positioned on a back portion of the vehicle and in communication with the data processing hardware. The method also includes overlaying, at the data processing hardware, a path on the one or more images. The method also includes receiving, at the data processing hardware, a command by way of a user interface in communication with the data processing hardware. The command includes instructions to adjust the path. The method also includes adjusting, at the data processing hardware, the path based on the received command. The method also includes transmitting, from the data processing hardware to a drive system in communication with the data processing hardware, a drive command causing the vehicle to autonomously maneuver along the adjusted path.

Implementations of the disclosure may include one or more of the following optional features. In some implementations, the command includes instructions to adjust a distance of the path, instructions to adjust an angle of the path, and/or instructions to adjust an angle of an end portion of the path. In some examples, the point of interest is a trailer. Adjusting the angle of the end portion of the path causes a fore-aft axis of the vehicle to be aligned with a fore-aft axis of the trailer.

In some implementations, before transmitting a drive command, the method includes receiving an action from a driver causing the data processing hardware to transmit the drive command. The method may further include instructing the user interface to display a position of the vehicle relative to the path during autonomous maneuvering of the vehicle in the rearward direction.

Another aspect of the disclosure provides a system for autonomously maneuvering a vehicle in a rearward direction towards a point of interest. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
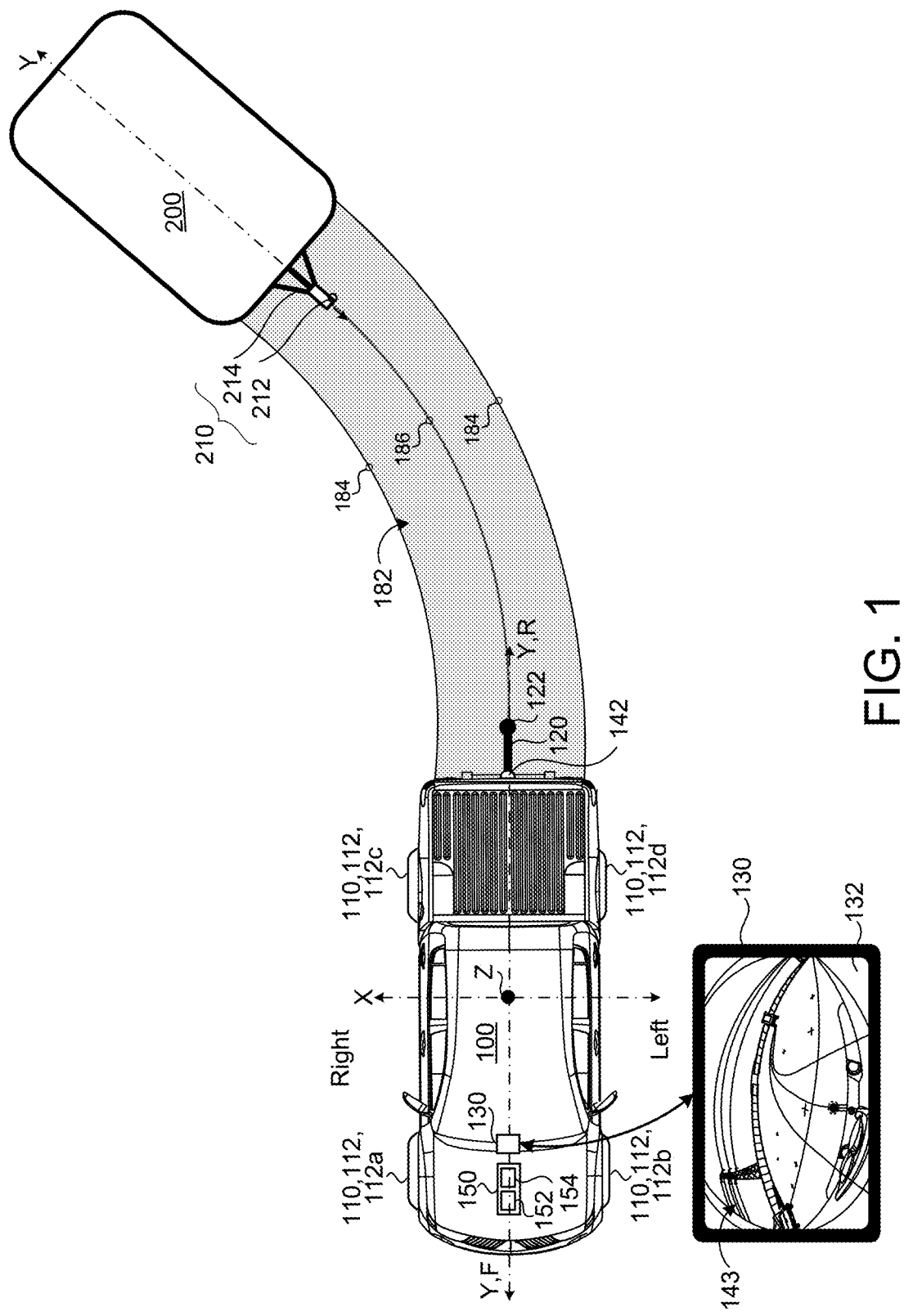
FIG. 1 is a schematic top view of an exemplary tow vehicle at a distance from a trailer.
Figure 2:
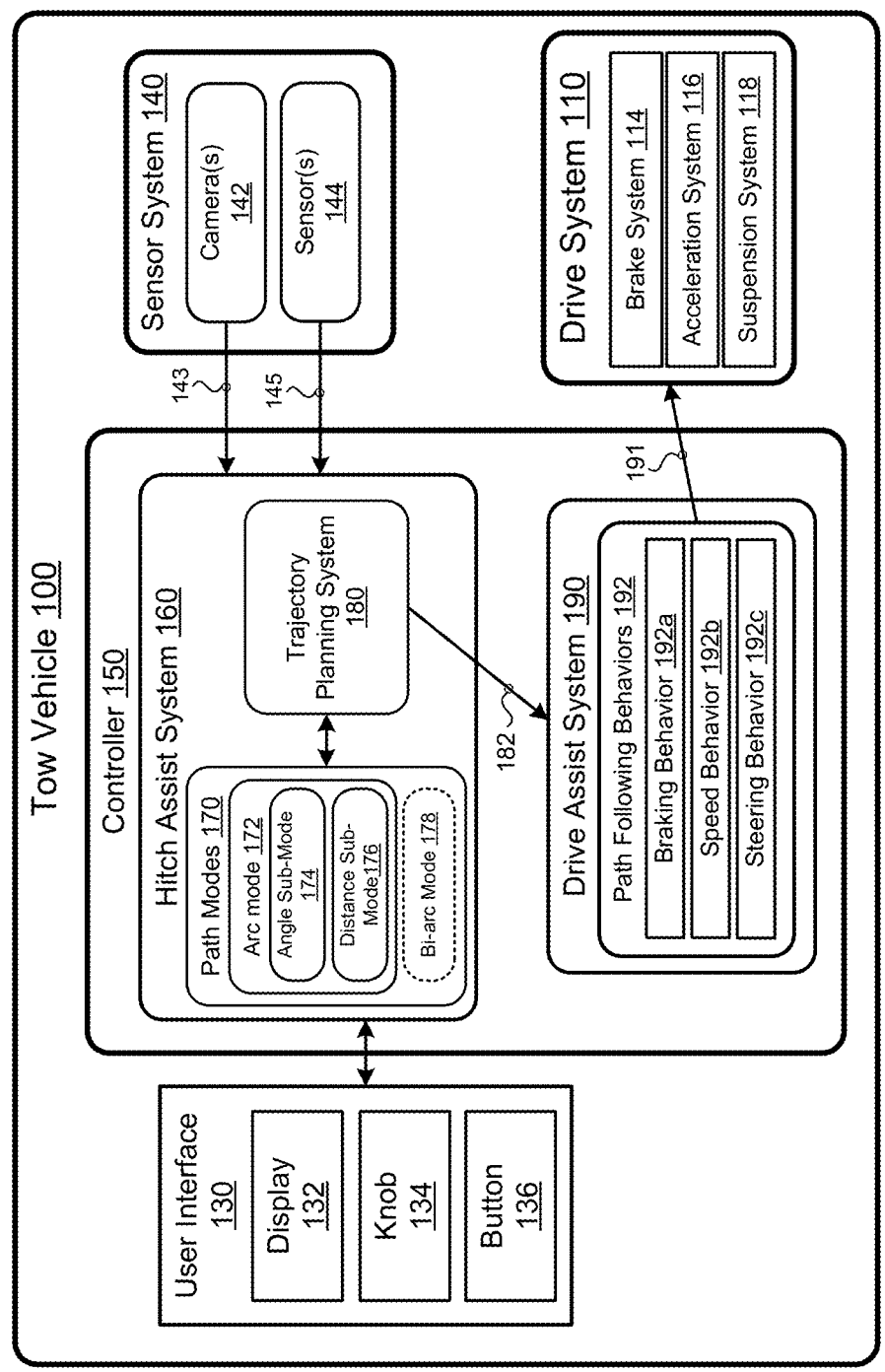
FIG. 2 is a schematic view of an exemplary tow vehicle having a hitch assist system.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of autonomously backing up towards a driver specified position, for example a trailer, identified from an image of the rearward environment of the vehicle and displayed on a user interface, such as a user display.

Referring to FIGS. 1-7, in some implementations, a driver of a tow vehicle 100 wants to specify a location or a trailer 200 behind the tow vehicle 100 such that the tow vehicle 100 can autonomously maneuver towards the location or the trailer 200. When the tow vehicle 100 and the trailer 200 are aligned, the tow vehicle 100 may be hitched (e.g., by way of the driver or autonomously) with the trailer 200. In some examples, the tow vehicle 100 includes a tow hitch 120 having a tow ball 122. The trailer 200 includes a trailer hitch 210 that includes a trailer coupler 212 and a tow bar 214. Therefore, the tow ball 122 is coupled with the trailer coupler 212.

The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 may be configured to adjust a height of the tow vehicle 100 allowing a tow vehicle hitch 120 (e.g., a tow vehicle hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 may include the display 132, a knob 134, and a button 136, which are used as input mechanisms. In some examples, the display 132 may show the knob 134 and the button 136. While in other examples, the knob 134 and the button 136 are a knob button combination. In some examples, the user interface 130 receives one or more driver commands from the driver via one or more input mechanisms or a touch screen display 132 and/or displays one or more notifications to the driver. The user interface 130 is in communication with a vehicle controller 150, which is in turn in communication with a sensor system 140. In some examples, the display 132 displays an image of an environment of the tow vehicle 100 leading to one or more commands being received by the user interface 130 (from the driver) that initiate execution of one or more behaviors. In some examples, the user display 132 displays an image of the rearward environment of the vehicle 100. In this case, the driver can select a position within the image that the driver wants the vehicle to autonomously maneuver towards. In some examples, the user display 132 displays one or more representations of trailers 200 positioned behind the vehicle 100. In this case, the driver selects one representation of a trailer 200 for the vehicle 100 to autonomously maneuver towards.

The display 132 displays a planned path 182 of the vehicle 100 that is superimposed on the camera image 143 of the rearward environment of the vehicle 100. The driver may change the planned path 182 using the user interface 130. For example, the driver may turn the knob 134, which simulates a virtual steering wheel. As the driver is turning the knob 134, the planned path 182 shown on the display 132 is updated. The driver adjusts the displayed path 182 until an updated planned path 182 displayed on the display 132 intersects the trailer representation 138 or other object that the driver wants the vehicle 100 to drive towards. Once the driver is satisfied with the planned path 182 displayed, then the driver executes an action indicative of finalizing the path 182 which allows the vehicle 100 to autonomously follow the planned path 182.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140. The sensor system 140 may include the one or more cameras 142. In some implementations, the tow vehicle 100 includes a rear camera 142 that is mounted to provide a view of a rear-driving path for the tow vehicle 100. The rear camera 142 may include a fisheye lens that includes an ultra wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture images of the rear of the vehicle 100.

The sensor system 140 may include other sensors such as, but not limited to, inertial measuring unit (IMU) radar, sonar, LIDAR (Light Detection and Ranging, which can entail optical remote sensing that measures properties of scattered light to find range and/or other information of a distant target), LADAR (Laser Detection and Ranging), ultrasonic sensors, etc.

The vehicle controller 150 includes a computing device (or processor) 152 (e.g., central processing unit having one or more computing processors) in communication with non-transitory memory 154 (e.g., a hard disk, flash memory, random-access memory, memory hardware) capable of storing instructions executable on the computing processor(s) 152.

The vehicle controller 150 executes a hitch assist system 160 that receives images 143 from the camera 142 and superimposes the vehicle path 182 on the received image 143. In some implementations, the driver may adjust the path 182 selection based on one or more path modes 170. In some examples, the path modes 170 include an arc mode 172 having an angle sub-mode 174 and a distance sub-mode 176. In some examples, the path modes 170 may include a bi-arc mode 178. Therefore, the driver may select between the angle sub-mode 174, the distance sub-mode, and/or the bi-arc mode 178 for determining and adjusting the path 182 to a trailer 200 or an object.

Figures 3A, 3B:
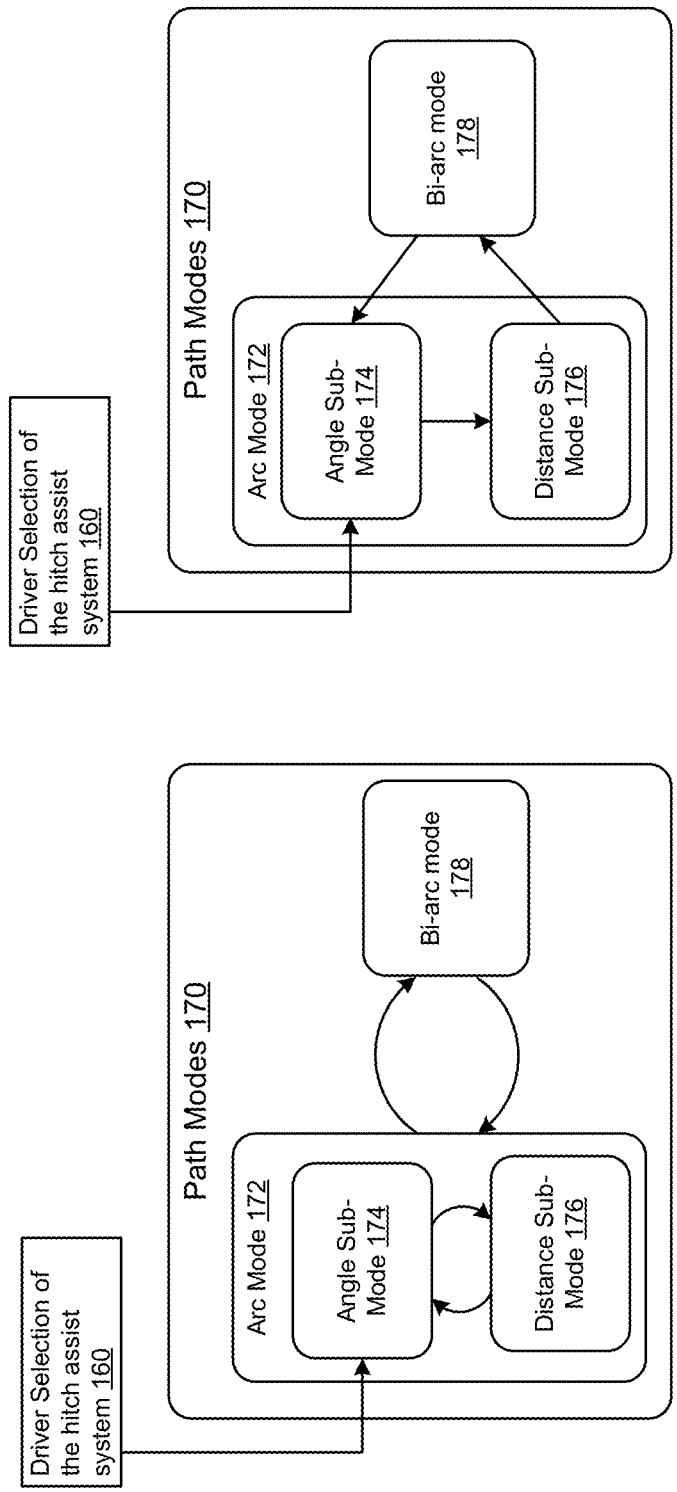
FIGS. 3A and 3B are schematic views of exemplary state chart of the system.

In some examples, the angle sub-mode 174 and the distance sub-mode 176 are part of the arc-mode 172 (FIG. 3A), therefore, the driver firsts selects a mode 172, 178, and then selects the sub-mode within the selected mode 172, 178. As such, for examples, the display 132 may display an arc mode button 136 and a bi-arc mode button 136, that the driver can select from. FIG. 3B shows an example, where each sub-mode/mode 174, 176, 178 is independent. Therefore, a press or push of the button 136 rotates between the three modes 174, 176, 178.

Figure 4A:
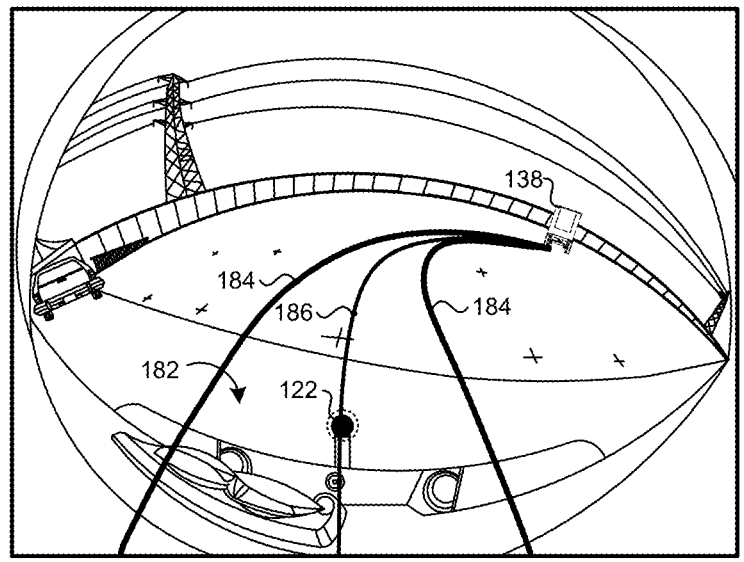
FIGS. 4A and 4B are schematic views of an exemplary angle mode.
Figure 4B:
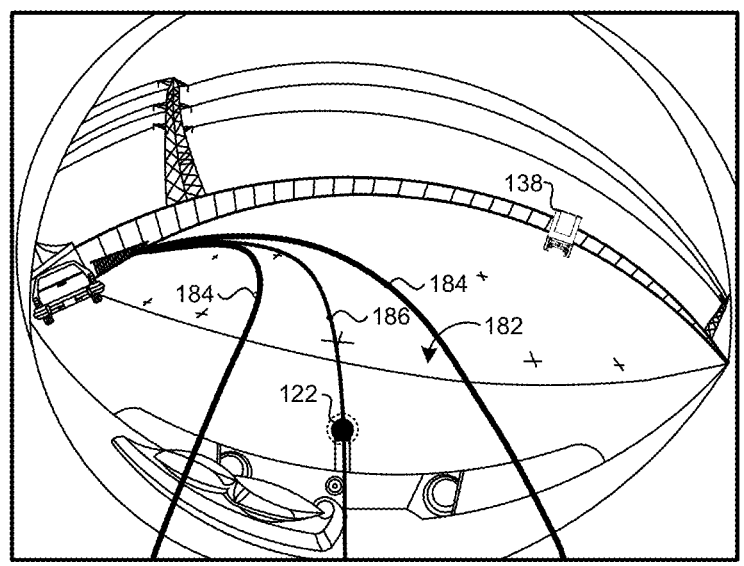
Figure 5A:
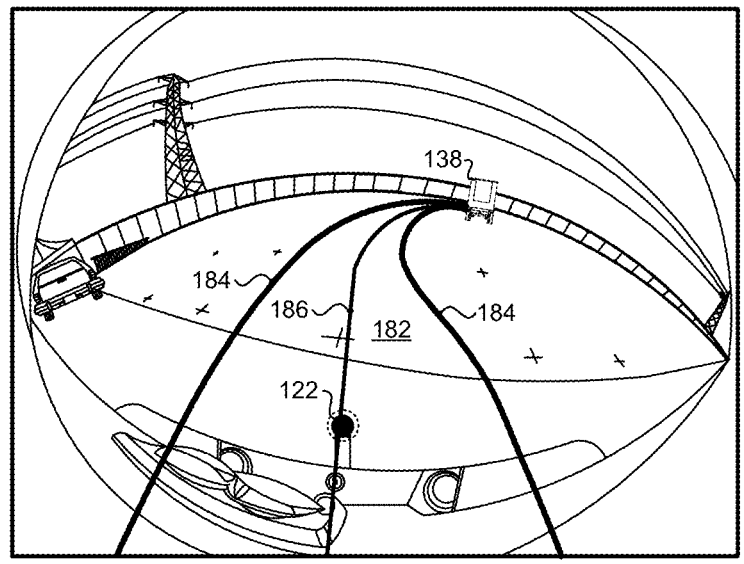
FIGS. 5A and 5B are schematic views of an exemplary distance mode.
Figure 5B:
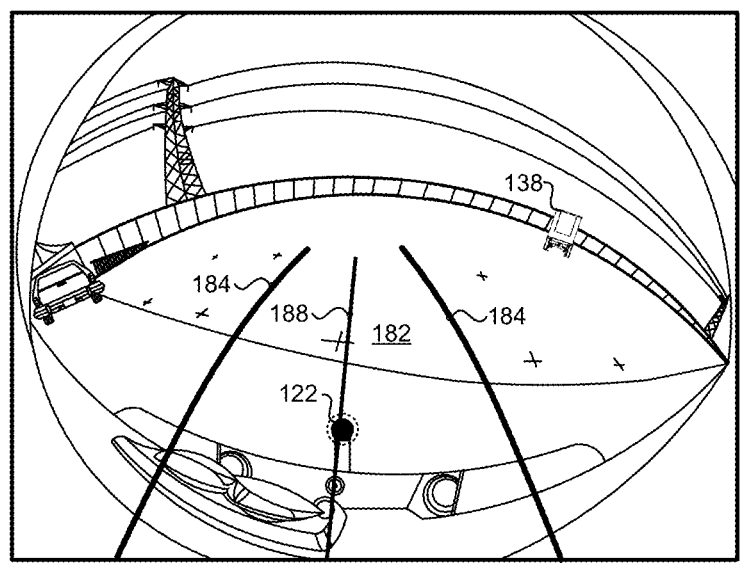
Figure 6A:
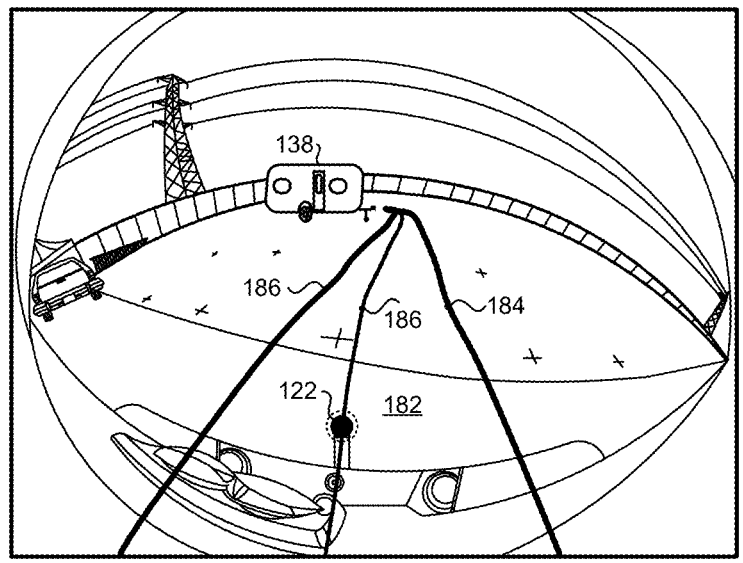
FIGS. 6A and 6B are schematic views of an exemplary bi-arc mode.
Figure 6B:
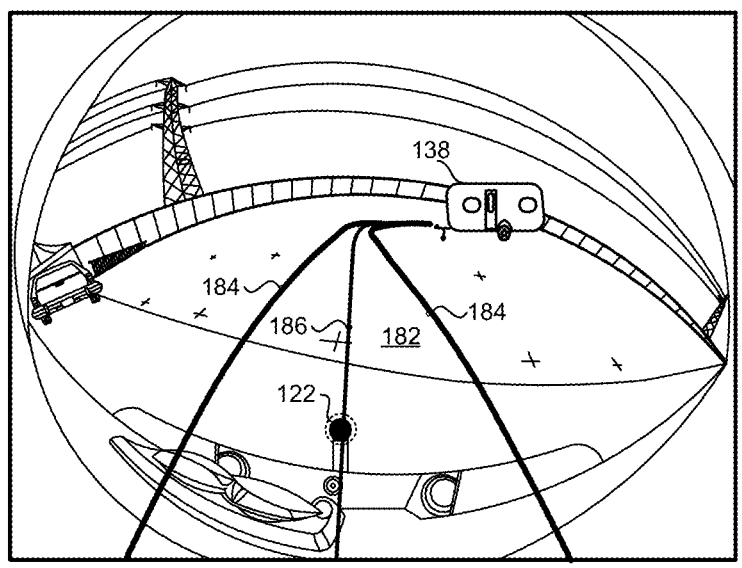

The angle sub-mode 174 is configured to adjust a curvature angle of the path 182 as shown in FIGS. 4A and 4B. Therefore, the driver can turn the knob 134 to the right causing the displayed path 182 to have a curvature to the right as shown in FIG. 4A. In addition, the driver my turn the knob 134 to the left causing the displayed path 182 to have a curvature to the left as shown in FIG. 4B. The distance sub-mode 176 is configured to adjust a length of the expected path 182 as shown in FIGS. 5A and 5B. For examples, referring to FIG. 5A, the driver can rotate the knob 134 to position a destination of the path 182 adjacent the trailer representation 138 in the image 143. Referring to FIG. 5B, the image 143 shows the path 182 having a shorter length than the path shown in FIG. 5A. Therefore, in this case, the driver may want that the tow vehicle 100 autonomously move few meters in the rearward direction R. The bi-arc mode 178 is configured to adjust an approach angle indicative of how the vehicle 100 will be oriented with respect to the trailer 200 (or other object) at the end of the path 182 as shown in FIGS. 6A and 6B. For example, the bi-arc mode 178 aids the driver in aligning the tow vehicle 100 with the trailer 200 such that the fore-aft axis Y of the vehicle 100 is aligned with a fore-aft axis Y of the trailer 200, which helps the driver during the hitching process between the tow vehicle 100 and the trailer 200.

In some implementations, where the bi-arc mode 178 is optional, if the driver is satisfied with the path 182 based on the arc mode 172 selection, then the driver may finalize the path 182 by pressing the button 136. Otherwise, the driver adjusts the knob 134 for the third time to change the shape of a bi-arc or other suitable path 182. This allows for adjusting the final approach angle to the trailer 200 or other object. Once the driver is satisfied with the choice of approach angle, he/she presses the button 136 to finalize the path choice.

In some implementations, the driver parks the tow vehicle 100 in a location where the trailer 200, or other object or point of interest, is within a field of view of the rear camera 142 of the vehicle 100. The engine of the tow vehicle 100 may be idling, and the transmission in Park position. The driver may initiate the hitch assist system 160 by pressing the button 136 and/or making a selection on the display 132. In some examples, the display 132 shows a selectable option or button 136 allowing the driver to initiate the Arc mode 172. The hitch assist system 160 begins by executing the angle sub-mode 174 of the arc mode 172, as shown in FIGS. 3A and 3B. The driver switches to distance sub-mode 176 to adjust the distance of the path 182, by for example, pressing the button 136. In some examples, the driver may adjust the path 182 by switching between angle sub-mode 174 and distance sub-mode 176 and adjusting the path 182 until the desired path 182 is shown on the display. The driver adjusts the path 182 such that the outer boundaries 184 of the path 182 interest the trailer 200 (i.e., the trailer representation 138 within the image 143) or other point of interest.

In some implementations, the final approach angle to the trailer 200 or the point of interest is important, for example, for aligning the vehicle fore-aft axis Y with the trailer fore-aft axis Y. In this case, the driver may select or press the "Arc/Bi-Arc Mode" button 136 (displayed on the display 132) and switch to the bi-arc mode 178. In the bi-arc mode 178 the previously set endpoint of the path 182 stays constant, and the driver adjusts the final approach angle with the knob 134. When the driver is satisfied with the final approach angle and with the complete trajectory or path 182, the driver may confirm the selected path 182 by executing an action. In some examples, the driver switches the transmission to reverse which is indicative that the driver is satisfied with the displayed path 182. In some examples, the driver switches the transmission into reverse with the brake on, then releases the brake, and the vehicle 100 follows the selected path 182. In some examples, while the vehicle is autonomously maneuvering in the rearward direction R along the path 182, the driver may stop the tow vehicle 100 by, for example, pressing the brake. This causes the controller 150 to exit the hitch assist system 160.

In some implementations, the hitch assist system 160 sets the path distance at a default, which allows the driver to only adjust the steering angle until it intersects the trailer 200 or other point of interest.

In some implementation, the final approach angle is not adjusted. Instead, the final approach angle is always the same as the initial vehicle departure angle. So, the final vehicle fore-aft axis Y is parallel to the initial vehicle fore-aft axis Y. In this case, the driver adjusts the final location of the path 182 to interest with the trailer.

In some examples, while the tow vehicle 100 is maneuvering in the rearward direction R along the path 182, the display 132 may show a progress of the vehicle 100 along the path 182. For example, the display 132 may show an original trajectory projected on the ground, but updated by the vehicle's changing position. The display 132 may also show an indication of how well the vehicle is following this trajectory.

Figure 7:
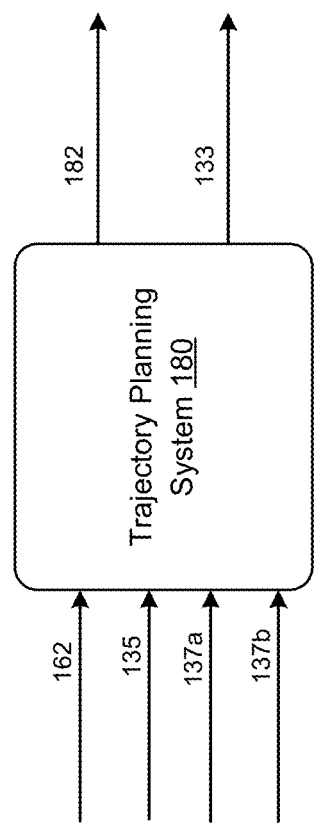
FIG. 7 is a schematic view of an exemplary trajectory planning system.

Referring to FIG. 7, in some examples, the trajectory planning system 180 receives data from other vehicle systems to generate the path 182. In some examples, the trajectory planning system 180 receive vehicle pose data 162 defined by (x, y, θ) where x is the position of a center of the tow vehicle 100 along the transverse axis X in and X-Y plane, y is the position of a center of the vehicle along the fore-aft axis Y in the X-Y plane, and θ is the heading of the tow vehicle 100. In addition, the trajectory planning system 180 may receive a position 135 of the knob 134, e.g., a knob angle, from the knob 134. The trajectory planning system 180 may also receive the mode button state 137a (i.e., arc mode 172 or bi-arc mode 178), and the sub-mode button state 137b (i.e., angle sub-mode 174 or distance sub-mode 176). Based on the received data, the trajectory planning system 180 adjusts the path 182 and instructs the display 132 to display the path 182. In some examples, the path 182 includes outer boundaries 184 and a tow ball path 186 being the estimated path of the tow ball 122. The trajectory planning system 180 may also instruct the display 132 to show the current mode or sub-mode status 133 indicative of the mode/sub-mode the drive has selected to adjust the path 182.

Once the trajectory planning system 180 determines the planned path 182, then the vehicle controller 150 executes a drive assist system 190, which in turn includes path following behaviors 192. The path following behaviors 192 receive the planned path 182 and executes one or more behaviors 192a-b that send commands 191 to the drive system 110, causing the vehicle 100 to autonomously drive along the planned path 182 in a rearward direction R.

The path following behaviors 192a-b may include one or more behaviors, such as, but not limited to, a braking behavior 192a, a speed behavior 192b, and a steering behavior 192c. Each behavior 192a-b causes the vehicle 100 to take an action, such as driving backward, turning at a specific angle, breaking, speeding, slowing down, among others. The vehicle controller 150 may maneuver the vehicle 100 in any direction across the road surface by controlling the drive system 110, more specifically by issuing commands 191 to the drive system 110.

The braking behavior 192a may be executed to either stop the vehicle 100 or to slow down the vehicle 100 based on the planned path. The braking behavior 192a sends a signal or command 191 to the drive system 110, e.g., the brake system (not shown), to either stop the vehicle 100 or reduce the speed of the vehicle 100.

The speed behavior 192b may be executed to change the speed of the vehicle 100 by either accelerating or decelerating based on the planned path 182. The speed behavior 192b sends a signal or command 191 to the brake system 114 for decelerating or the acceleration system 116 for accelerating.

The steering behavior 192c may be executed to change the direction of the vehicle 100 based on the planned path 182. As such, the steering behavior 192c sends the acceleration system 130 a signal or command 191 indicative of an angle of steering causing the drive system 110 to change direction.

Figure 8:
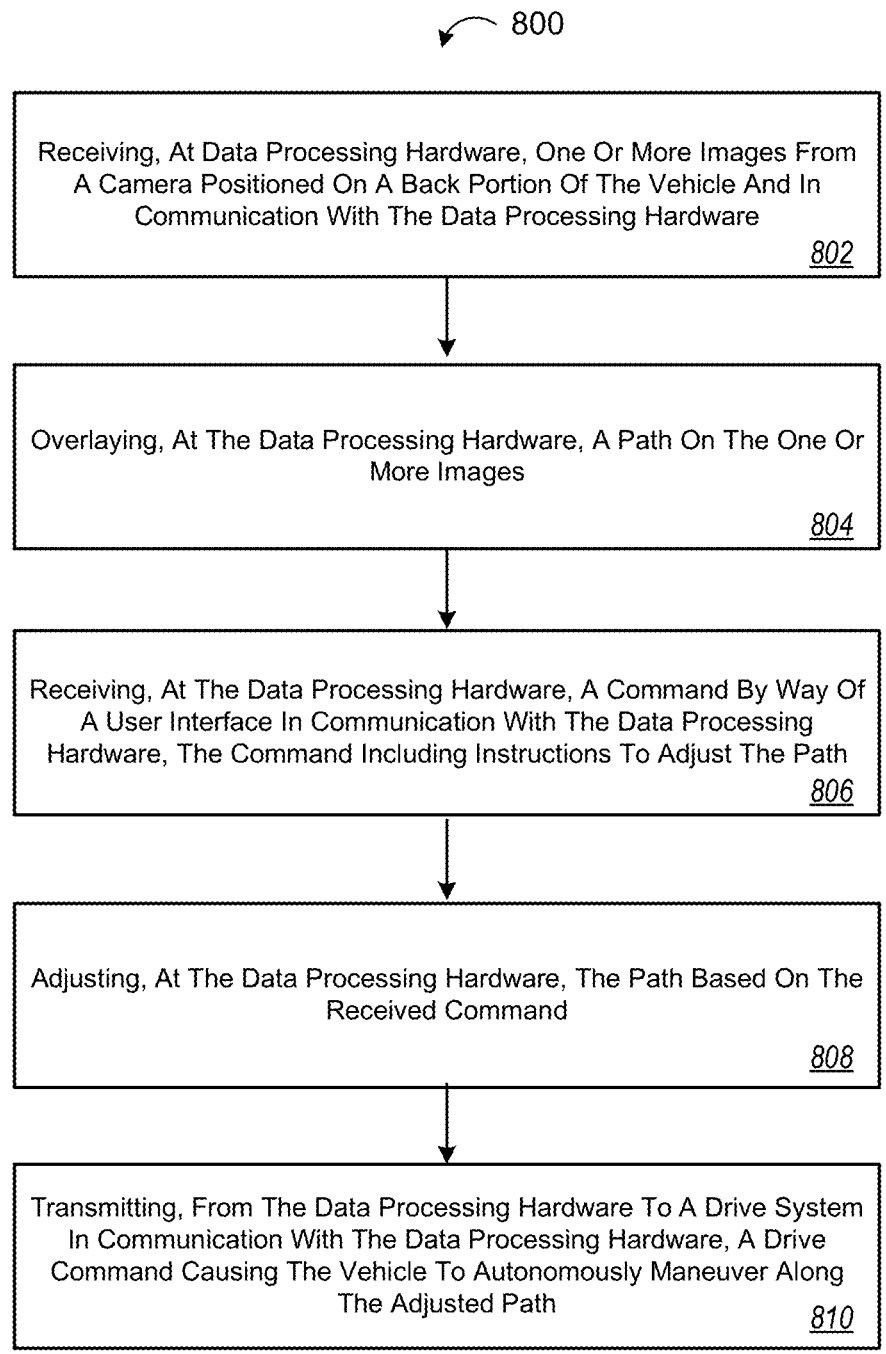
FIG. 8 is a schematic view of an exemplary an exemplary method for determining a path from a trailer to a driver specified location.

FIG. 8 provides an example arrangement of operations of a method 800 for autonomously maneuvering a vehicle 100 (e.g., a tow vehicle) in a rearward direction R towards a point of interest, such as a trailer 200, using the system described in FIGS. 1-7. At block 802, the method 800 includes receiving, at data processing hardware 152, one or more images 143 from a camera 142 positioned on a back portion of the vehicle 100 and in communication with the data processing hardware 152. At block 804, the method 800 includes overlaying, at the data processing hardware 152, a path 182 on the one or more images 143. At block 806, the method 800 also includes receiving, at the data processing hardware 152, a command by way of a user interface 130 in communication with the data processing hardware 152, the command including instructions to adjust the path 182. At block 808, the method 800 includes adjusting, at the data processing hardware 152, the path 182 based on the received command. In some examples, the method 800 includes transmitting, from the data processing hardware 152 to a drive system 110 in communication with the data processing hardware 152, a drive command 191 causing the vehicle 100 to autonomously maneuver along the adjusted path 182.

In some examples, the command includes at least one of, instructions to adjust a distance of the path, instructions to adjust an angle of the path, and instructions to adjust an angle of an end portion of the path. In some examples, where the point of interest is a trailer 200, adjusting the angle of the end portion of the path causes a fore-aft axis Y of the vehicle 100 to be aligned with a fore-aft axis Y of the trailer 200.

In some examples, before transmitting a drive command, the method 800 includes receiving an action from a driver causing the data processing hardware 152 to transmit the drive command 191. The method 800 may also include, during autonomous maneuvering of the vehicle 100 in the rearward direction R, instructing the user interface 130 to display a position of the vehicle relative to the path 182.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for autonomously maneuvering a vehicle in a rearward direction towards a point of interest, the method comprising:

receiving, at data processing hardware, one or more images from a camera positioned on a back portion of the vehicle and in communication with the data processing hardware;

overlaying, at the data processing hardware, a path on the one or more images;

receiving, at the data processing hardware, a command by way of a user interface in communication with the data processing hardware, the command including instructions to adjust the path based on the overlayed path;

adjusting, at the data processing hardware, the path based on the received command;

receiving, at the data processing hardware, an indication by way of the user interface that the adjust path is finalized;

in response to the received indication that the adjusted path is finalized, transmitting, from the data processing hardware to a drive system in communication with the data processing hardware, a drive command causing the vehicle to autonomously maneuver along the adjusted path, wherein the overlaying, the receiving of the command, the path adjusting, and the receiving of the indication are performed prior to initial movement of the vehicle towards the point of interest, wherein the command includes instructions to adjust at least one of a distance of the path or an angle of an end portion of the path.

2. The method of claim 1, wherein the instructions are to adjust the distance of the path.

3. The method of claim 1, wherein the command includes instructions to adjust an angle of the path.

4. The method of claim 1, wherein the instructions are to adjust the angle of the end portion of the path.

5. The method of claim 4, wherein the point of interest is a trailer, and wherein adjusting the angle of the end portion of the path causes a fore-aft axis of the vehicle to be aligned with a fore-aft axis of the trailer.

6. The method of claim 1, wherein before transmitting a drive command, the method includes receiving an action from a driver causing the data processing hardware to transmit the drive command.

7. The method of claim 1, further comprising:

during autonomous maneuvering of the vehicle in the rearward direction, instructing the user interface to display a position of the vehicle relative to the path.

8. A system for autonomously maneuvering a vehicle in a rearward direction towards a point of interest, the system comprising:

data processing hardware; and memory hardware in communication with the data processing hardware, the memory hardware storing instructions that when executed on the data processing hardware cause the data processing hardware to perform operations comprising receiving one or more images from a camera positioned on a back portion of the vehicle and in communication with the data processing hardware;

overlaying a path on the one or more images;

receiving a command by way of a user interface in communication with the data processing hardware, the command including instructions to adjust the path based on the overlayed path;

adjusting the path based on the received command;

receiving an indication by way of the user interface that the adjust path is finalized; and in response to the received indication that the adjusted path is finalized, transmitting a drive command to a drive system in communication with the data processing hardware, the drive command causing the vehicle to autonomously maneuver along the adjusted path, wherein the overlaying, the receiving of the command, the path adjusting, the receiving of the indication are performed prior to initial movement of the vehicle towards the point of interest, wherein the command includes instructions to adjust at least one of a distance of the path or an angle of an end portion of the path.

9. The system of claim 8, wherein the command includes instructions to adjust the distance of the path.

10. The system of claim 8, wherein the command includes instructions to adjust an angle of the path.

11. The system of claim 8, wherein the command includes instructions to adjust the angle of the end portion of the path.

12. The system of claim 11, wherein the point of interest is a trailer, and wherein adjusting the angle of the end portion of the path causes a fore-aft axis of the vehicle to be aligned with a fore-aft axis of the trailer.

13. The system of claim 8, wherein before transmitting a drive command, the operations further include receiving an action from a driver causing the data processing hardware to transmit the drive command.

14. The system of claim 8, wherein the operations further include:

during autonomous maneuvering of the vehicle in the rearward direction, instructing the user interface to display a position of the vehicle relative to the path.

15. The method of claim 1, further comprising, in response adjusting the path, and prior to receiving the indication and prior to the initial movement of the vehicle towards the point of interest, overlaying, at the data processing hardware, the adjusted path on the one or more images.

16. The system of claim 8, wherein the operations further comprise, in response adjusting the path, and prior to receiving the indication and prior to the initial movement of the vehicle towards the point of interest, overlaying the adjusted path on the one or more images.

17. The method of claim 3, wherein the user interface comprises a rotary knob and the command comprises instructions to adjust the angle of the path including data corresponding to rotation of the knob.

18. The method of claim 1, wherein the user interface comprises a rotary knob and the command comprises instructions to adjust the at least one of the distance of the path or the angle of the end portion of the path including data corresponding to rotation of the knob.

19. The system of claim 8, wherein the user interface comprises a rotary knob and the command comprises instructions to adjust the at least one of a distance of the path or the angle of the end portion of the path including data corresponding to rotation of the knob.

20. The system of claim 10, wherein the user interface comprises a rotary knob and the command comprises instructions to adjust the angle of the path including data corresponding to rotation of the knob.

21. A system for autonomously maneuvering a vehicle in a rearward direction towards a point of interest, the system comprising:

data processing hardware; and memory hardware in communication with the data processing hardware, the memory hardware storing instructions that when executed on the data processing hardware cause the data processing hardware to perform operations comprising receiving one or more images from a camera positioned on a back portion of the vehicle and in communication with the data processing hardware;

overlaying a path on the one or more images;

receiving a command by way of a user interface in communication with the data processing hardware, the command including instructions to adjust the path based on the overlayed path;

adjusting the path based on the received command;

receiving an indication by way of the user interface that the adjust path is finalized; and in response to the received indication that the adjusted path is finalized, transmitting a drive command to a drive system in communication with the data processing hardware, the drive command causing the vehicle to maneuver along the adjusted path, wherein the overlaying, the receiving of the command, the path adjusting, the receiving of the indication are performed prior to initial movement of the vehicle towards the point of interest, wherein the user interface comprises a rotary knob and the instructions to adjust the path include data corresponding to manual rotation of the knob.

22. The system as recited in claim 21, wherein the command includes instructions to adjust at least one of a distance of the path, an angle of the path, or an angle of an end portion of the path.

\* \* \* \* \*